April 15, 1958 — A. A. McMURRAY — 2,830,559
HARNESS SUPPORTED ANIMAL SPRAYING DEVICE
Filed April 27, 1955 — 2 Sheets-Sheet 1
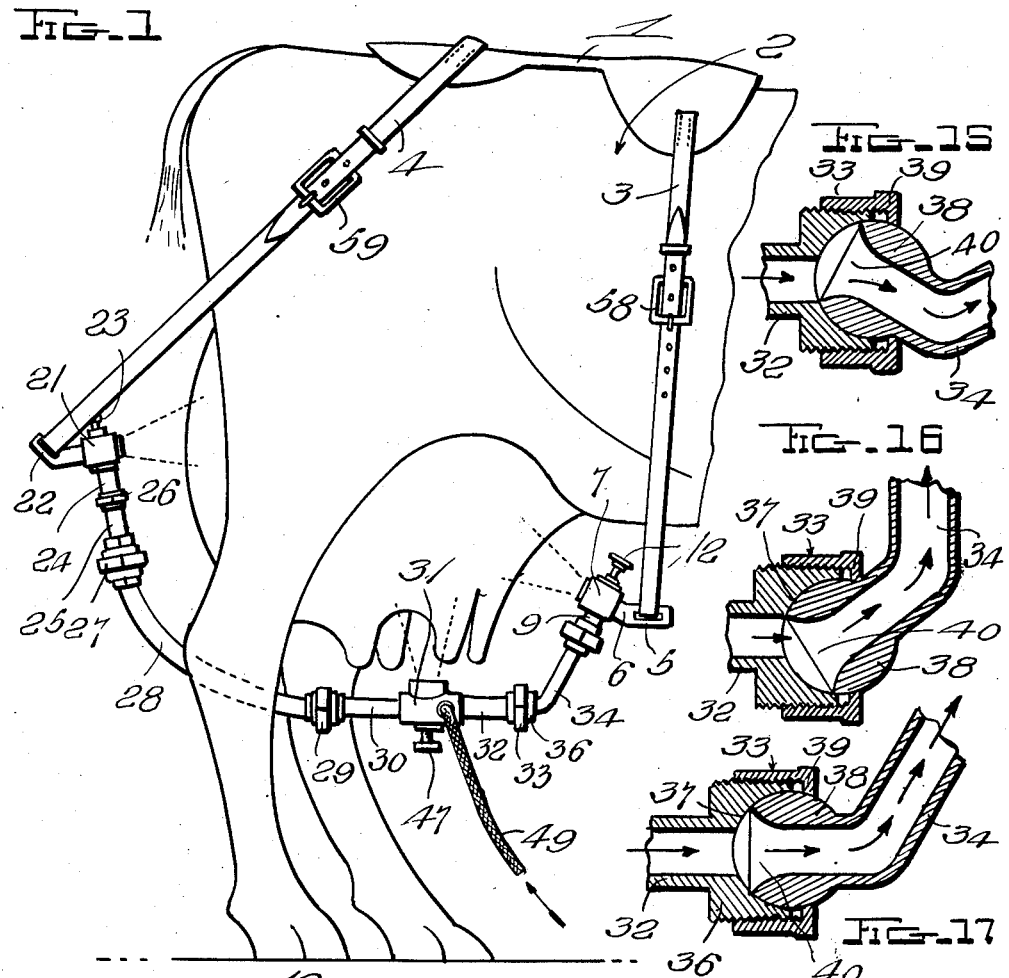
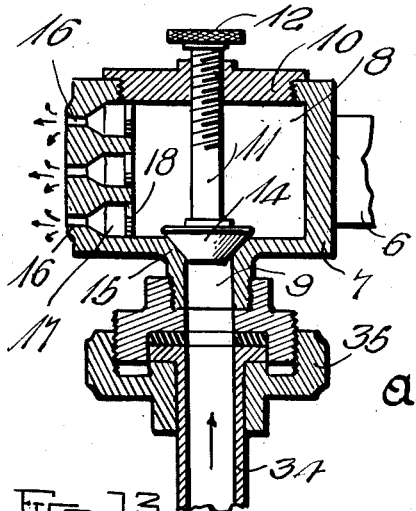
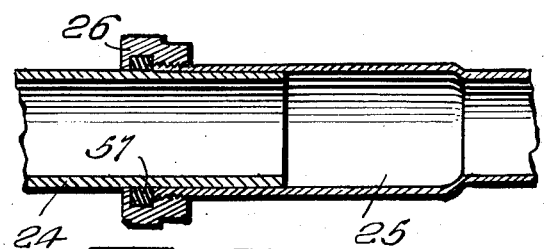
INVENTOR
Arthur A. McMurray, D.V.M.
BY
John B. Brady
ATTORNEY

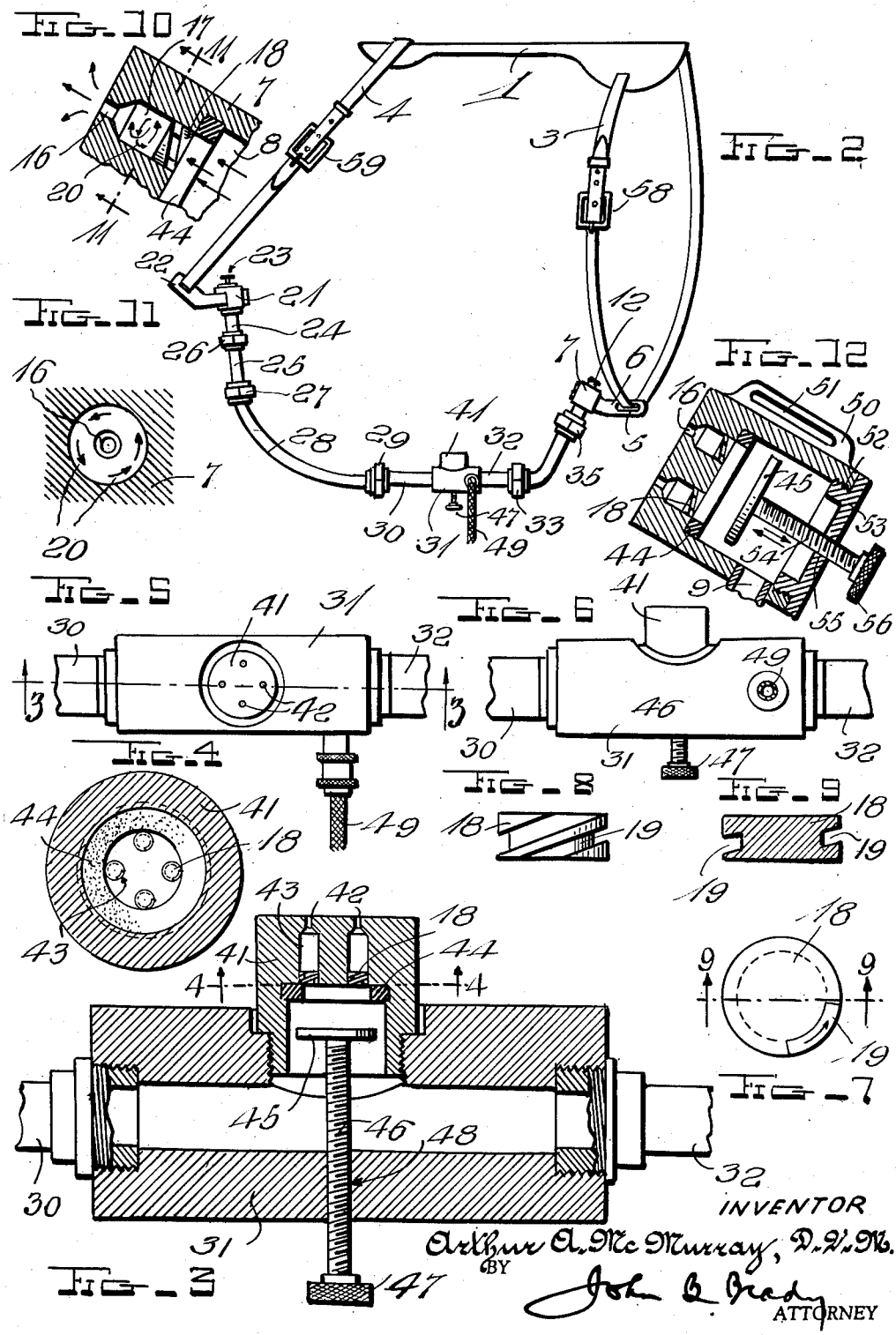

United States Patent Office 2,830,559
Patented Apr. 15, 1958

2,830,559
HARNESS SUPPORTED ANIMAL SPRAYING DEVICE

Arthur A. McMurray, Lakeland, Fla.

Application April 27, 1955, Serial No. 504,297

5 Claims. (Cl. 119—159)

My invention relates broadly to animal husbandry and more particularly to a harness assembly arranged to fit over the body of an animal for pressure spraying the animal and beneficially applying treatments, medication and sanitation thereto.

One of the objects of my invention is to provide an adjustable harness spray assembly for animals which is readily adjustable to animals of various kinds and sizes for pressure spraying a multiplicity of parts or members of the body of the animal simultaneously for imparting beneficial treatments, medicaments, or sanitation thereto.

Another object of my invention is to provide an adjustable harness adapted to fit over the body of an animal and connectable to a fluid pressure supply system for developing a plurality of spirally moving fluid jets adapted to be directed against various parts of the body of the animal for washing the parts of the animal in a circular spinning path for removing bacteria, germs and vermin, and beneficially treating or medicating inflammations, sores, or swollen parts of the animal.

Still another object of my invention is to provide means for slidably and angularly adjusting a multiplicity of pressure spray-heads in a pressure spray harness assembly for adaptation to different kinds and sizes of animals for insuring the most effective medication or treatment of the various parts of the animal.

Other and further objects of my invention reside in the construction of a multiple head pressure spray system attachable to the body of an animal for imparting beneficial effects thereto as set forth more fully in the specification hereinafter following by reference to the accompanying drawings, in which:

Fig. 1 is a schematic view showing the manner in which the harness assembly of my invention is fitted to a dairy cow;

Fig. 2 is a partial perspective view of the harness assembly of my invention;

Fig. 3 is an enlarged vertical sectional view taken through the lowermost spray-head and fluid supply fitting in the harness assembly of my invention, the view being taken substantially on line 3—3 of Fig. 5;

Fig. 4 is an enlarged transverse sectional view through the spray-head shown in Fig. 3, taken on line 4—4 thereof;

Fig. 5 is an enlarged fragmentary top plan view of the spray-head shown in Figs. 3 and 4;

Fig. 6 is an enlarged side elevational view of the spray-head of Figs. 3–5;

Fig. 7 is an enlarged plan view of one of the jet fittings by which a spiral discharge is obtained through each of the nozzles of the spray-head;

Fig. 8 is an enlarged side elevational view of the jet fitting shown in Fig. 7;

Fig. 9 is an enlarged vertical sectional view on line 9—9 of Fig. 7;

Fig. 10 is an enlarged vertical sectional view through one of the jet discharge nozzle openings of the spray-head illustrating the manner of securing the spinning discharge through the nozzle head, the view being taken substantially on line 3—3 of Fig. 5;

Fig. 11 is an enlarged transverse sectional view taken on line 11—11 of Fig. 10 and illustrating the spinning discharge more clearly;

Fig. 12 is an enlarged vertical sectional view, partially in elevation, of a modified form of spray-head used at the terminating end of the harness assembly shown in Figs. 1 and 2;

Fig. 13 is an enlarged vertical sectional view through one of the spray-heads used in the harness assembly of Figs. 1 and 2, the view being taken in the plane of the sheet of drawing on which Figs. 1 and 2 are shown;

Fig. 14 is an enlarged fragmentary longitudinal sectional view of the telescopic adjustable slide fitting used in the harness assembly of Figs. 1 and 2;

Fig. 15 shows by a sectional view the manner of angularly mounting one of the spray-heads at one terminating end of the harness assembly;

Fig. 16 shows by a sectional view the spray-head connection of Fig. 15 moved to an opposite limiting angular position for adjustment to various kinds and sizes of animals; and Fig. 17 shows by a sectional view the normal position of the spray-head connection at the terminating end of the harness assembly as distinguished from the opposite limiting positions illustrated in Figs. 15 and 16, as aforesaid.

My invention is directed to a multiple head pressure spray system applicable to animals generally but for purposes of illustration I have shown my invention applied to the treatment of dairy cows for improving sanitation and beneficially increasing the conditions of health of the cows. It is not unusual to discover dairy cows suffering from a condition of swollen, edematous, or infected udders. By applying the harness of my invention to the body of such cows and angularly adjusting the multiple spray-heads carried thereby, for directing a washing or medicating fluid against the parts so affected, these abnormal conditions can be relieved, improved, and remedied for rapidly restoring the cows to healthful, productive conditions for the more economical operation of the dairy. I provide a special fitting in the paths of the jets of each nozzle for developing a spinning force which drives the atomized spray in a circular path for more forcefully and effectively washing the parts of the body of the animal being treated. The force spray is thoroughly reliable for removing secretions from the animal and improving cleanliness of the animal. The nozzles are each angularly adjustable to spray the parts to be treated most effectively, and slidable telescopic connections are provided between the nozzles to enable the assembly to be adjusted to fit the size and shape of the animal.

Referring to the drawings in more detail, reference character 1 represents a support or surcingle which may be fitted over the body of an animal, such as a cow, shown at 2, and provides a pendant suspension for the adjustable strap sling, represented at 3, adjacent one end of the support 1 and the adjustable strap sling 4 adjacent the other end of the support 1. The strap sling 3 extends through the slot 5 formed in the lug 6 which extends from the sprayer-head indicated at 7. The sprayer-head 7 is shown more clearly in Fig. 13 as consisting of the cylindrical chamber 8 having a fluid pressure intake 9 in one end thereof and a removable plate 10 in the other end thereof. The removable plate 10 is provided with a screw-threaded connection with the chamber 8 and carries the screw-threaded adjustable shank 11, having an external knurled head 12 on one end thereof and the valve 14 on the other end thereof. The valve 14 is adapted to be adjustably seated against the annular valve seat 15 for controlling the fluid pressure flow from the fluid pressure intake 9. The chamber 8 terminates in the circular orifices 16 which connect with the interior of chamber 8 through the tapered cylindrical passages represented at 17. Each of these passages are closed on the chamber side of the sprayer-head by means of circular discs 18 shown on an enlarged scale in Figs. 7, 8 and 9. These discs are machined to a diameter slightly over-size with respect to the diameter of passages 17 so that discs 18 fit vertically in the ends of the cylindrical passages 17 and are secured therein by friction and are each provided with a spiral groove 19 which terminates in a fluid pressure intake on the chamber side of the discs and a fluid pressure outlet on the cylindrical passage side of the discs. The fluid from the fluid pressure intake 9 enters chamber 8 and enters the intake side of each of the grooved discs 18 and as indicated more clearly in Figs. 10 and 11 is spun into a circular path indicated by the arrows 20. This spirally moving jet of fluid in discharging through the orifice 16 imparts a scrubbing and cleaning action to the parts of the body of the animal as represented in Fig. 1.

The sprayer-head 21 is similar to the sprayer-head 7 and is supported from the strap sling 4 through lug 22 through which the strap sling 4 passes. An adjustment means 23, similar to the adjustment means 12 is associated with the sprayer-head 21. The sprayer-head 21 connects to tube 24 and to the coupling tube 25 by adjustable coupling 26 shown more clearly in Fig. 14. The coupling tube 25 connects through the coupling 27 to the deformable pipe 28 which may be shaped to properly position the sprayer-head 21 with respect to the body of the animal. The deformable pipe 28 is connected through coupling 29 with pipe 30 which connects to one end of the fitting 31. Fitting 31 is shown more clearly in Figs. 3–6 wherein the opposite end thereof provides a connection for pipe 32 which leads to the coupling 33 which I have shown more clearly in Figs. 15–17. The coupling 33 provides an angularly adjustable connection for the tube 34 to enable sprayer-head 7, which connects with the tube 34 through gasket sealed fluid-tight screw-threaded coupling 35 to be adjusted to the proper angular position in association with the assembly of the sprayer-heads to adequately treat the various parts of the animal. The coupling 33 is provided with an externally screw-threaded flanged end 36 having a substantially semi-spherical recess 37 therein. The tube 34 terminates in a coacting substantially spherical end 38 which is gripped and maintained in position by the flanged screw-threaded adjustable sleeve 39 engaged over the external screw-threads on the flanged end 36. The tube 34 is flared outwardly as it passes through the substantially spherical end 38, as represented at 40, and terminates in a diameter which exceeds the diameter of the pipe 32. By reason of this enlargement the substantially spherical end 38 may be angularly shifted to either of the limiting positions represented in Figs 15 and 16 for receiving the pressure fluid flow from pipe 32 without restriction and permit sprayer-head 7 to be located in that angular position which is most effective in spraying the parts of the animal. The combination of the rigid coupling tube 25, the deformable pipe 28, the rigid pipe 32, and rigid tube 34 forms a fluid distributing conduit which is slung beneath and in spatial relation to the vital parts of the animal to be treated in a position extending longitudinally in relation to the body of the animal and so shaped that the sprayer head 21, sprayer head 41 and sprayer head 7 direct the liquid spray toward the vital parts of the animal being treated on different levels, that is, sprayer head 21 directs the spray on the rear of the vital parts, sprayer head 41 directs the spray upwardly beneath the vital parts and sprayer head 7 directs the spray toward the front of the vital parts. The spray head 7 at the front of the vital parts is located at a level intermediate the level of the sprayer head 41 and the sprayer head 21, thereby insuring simultaneous treatment of the entire area of the vital parts.

The fitting 31 carries the centrally arranged screw-threaded sprayer-head 41 which is also provided with orifices shown at 42 similar to the orifices 16 behind which cylindrical passages 43 are arranged and which are closed by circular discs 18 similar to the discs 18 already described and shown in Figs. 7–9. Thus a spiral movement is imparted to the fluid pressure discharged from sprayer-head 41 for effectively washing the parts of the animal. The sprayer-head 41 is provided with a sealing gasket 44 against which the adjustable disc 45 carried by the screw-threaded adjustment member 46 may be advanced or retracted within the sprayer-head by knurled adjustment member 47. The screw-threaded adjustment member 46 is adjustable in screw-threads 48 in the wall of the fitting 31 whereby the sprayer-head 41 may be cut on or off so far as the flow of fluid from the pressure intake pipe 49 is concerned.

The fluid supplied through pressure intake pipe 49 may be water, a medicinal solution or any other form of beneficial pressure spray fluid. The closing of disc 45 against sealing gasket 44 diverts the flow of the pressure fluid through pipes 30 and 32 to the sprayer-heads 7 and 21 which may be individually cut off for governing the spray of the pressure fluid to the parts of the animal.

In lieu of the sprayer-heads 7 and 21 I may employ the arrangement of sprayer-head shown in Figs. 11 and 12 wherein the sprayer-head is provided with a lug 50 slotted at 51 for the passage of the pendant strap slings 3 or 4. In this arrangement the end of chamber 8 is internally screw-threaded at 52 to receive the screw-threaded plate 53 which supports the screw-threaded adjustable stem 54 carrying disc 45 adapted to contact with sealing gasket 44. The adjustable stem 54 is screw-threaded to engage screw-threads 55 formed in the plate 53. Adjustment of stem 54 is controlled by knurled knob 56 for advancing or retracting disc 45 with respect to sealing gasket 44.

As heretofore noted a slip-joint, such as shown in Fig. 14, may be arranged at any desired position between the sprayer-heads in the sprayer-head assembly, as for example between tubes 24 and 25 where the gasket 57 is compressed by the movement of coupling 26 into screw-threaded connection with the end of coupling tube 25 for thus sealing tube 24 with respect to tube 25.

The harness assembly from sprayer-head 7 to sprayer-head 21 is deformable to fit individual cows by reason of the deformable properties of pipe 28 and when so shaped the assembly is substantially rigid and is suspended by the pendant strap slings 3 and 4 supported over the back of the cow as shown in Figs. 1 and 2.

As heretofore explained the harness assembly may be adjusted along a longitudinal axis or the heads may be angularly shifted in lateral planes with respect to each other and the sprayer-heads then angularly adjusted for directing the fluid pressure in a spray in the proper directions against the parts of the animal.

I have found the spraying apparatus of my invention highly effective in veterinary work in improving the health of dairy cows and reducing infection. The harness assembly of my invention is applicable to a variety of animals. The adjustments secured through the various couplings, the slidable connections and the angular movements of which the sprayer-heads are capable in addition to the adjustable buckle and strap connections 58 and 59 in the strap-slings 3 and 4, insure the adaptation of the sprayer apparatus in various sizes and shapes of animals.

While I have described my invention in certain of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. A spray assembly for spraying fluid upon the vital parts of animals comprising a lineally extending conduit having a pair of rigid sections interconnected by a deformable section, said rigid sections having means on one end thereof connected with a surcingle suspending said conduit from opposite ends longitudinally of the body of the animal being treated and in a position in which said conduit extends in spatial relation around the vital parts of the animal being treated, vertically spaced sprayer heads carried by the rigid sections of said conduit on different levels having discharge portions convergingly directed toward the vital parts of the animal being treated, means connected to one of said rigid sections for supplying fluid under pressure to said conduit for distribution through said conduit to said sprayer heads for simultaneous delivery from said sprayer heads at different levels in the direction of the front and back of the vital parts of the animal and upwardly towards the vital parts of the animal.

2. A spray assembly for spraying fluid upon the vital parts of animals as set forth in claim 1, in which one of said rigid sections connected with one end of said deformable section is divided into two portions coupled end-to-end for the passage of fluid therethrough and wherein one of said portions may be angularly adjusted toward and away from said rigid section which connects with the other end of said deformable section for adjustably locating the sprayer heads in relation to the front and rear of the vital parts of the animal being treated.

3. A spray assembly for spraying fluid upon the vital parts of animals as set forth in claim 1, in which the rigid section which connects with one end of said deformable section comprises a substantially horizontally extending portion and a portion extending upwardly from said substantially horizontally extending portion, coupling means between said last mentioned portion and that end of the horizontally extending portion whereby said upwardly extending portion may be angularly moved toward or away from the front of the vital parts of the animal being treated, and whereby the other of said rigid sections connected with the other end of said deformable section may be adjusted toward or away from the rear of the vital parts of the animal being treated.

4. A spray assembly for spraying fluid upon the vital parts of animals as set forth in claim 1, in which the sprayer head which directs a fluid spray upon the front of the vital parts of the animal is located on a level that is intermediate the level of the sprayer head that directs a fluid spray upwardly onto the vital parts of the animal and the level of the sprayer head that directs the fluid spray upon the back of the vital parts of the animal.

5. A spray assembly for spraying fluid upon the vital parts of animals as set forth in claim 1 in which an enlarged fluid chamber is interposed between the path of flow of fluid through said conduit and each sprayer head and wherein the chambers associated with the sprayer heads at opposite ends of said conduit each includes slotted lugs providing connections to said surcingle for suspending the conduit from its opposite ends longitudinally of the body of the animal.

References Cited in the file of this patent

UNITED STATES PATENTS

| | | |
|---|---|---|
| 1,132,639 | Truchot | Mar. 23, 1915 |
| 1,511,450 | Findlay | Oct. 14, 1924 |
| 2,098,136 | Dyckerhoff | Nov. 2, 1937 |
| 2,462,689 | Stretz | Feb. 22, 1949 |
| 2,532,251 | Whitmire et al. | Nov. 28, 1950 |
| 2,731,300 | Jansen | Jan. 17, 1956 |